(12) United States Patent
Reina, Jr.

(10) Patent No.: US 6,279,984 B1
(45) Date of Patent: Aug. 28, 2001

(54) AUTO VISOR

(76) Inventor: Lawrence Reina, Jr., P.O. Box 684, Carmel, NY (US) 10512

( * ) Notice: Subject to any disclaimer, the term of this patent is extended or adjusted under 35 U.S.C. 154(b) by 0 days.

(21) Appl. No.: 09/379,503

(22) Filed: Aug. 24, 1999

(51) Int. Cl.$^7$ ................................................. B60J 3/00
(52) U.S. Cl. ................................... 296/97.1; 296/95.1
(58) Field of Search ....................... 296/97.1, 99.1, 296/95.1

(56) References Cited

U.S. PATENT DOCUMENTS

| | | | |
|---|---|---|---|
| 4,090,732 | * 5/1978 | Visitsky | 296/97.1 |
| 4,149,749 | * 4/1979 | Canal | 296/97.1 |
| 4,848,827 | * 7/1989 | Ou | 296/99.1 |

FOREIGN PATENT DOCUMENTS

| | | | |
|---|---|---|---|
| 0204044 | * 12/1986 | (EP) | 296/95.1 |
| 1545130 | * 12/1986 | (FR) | 296/95.1 |
| 0031682 | * 3/1980 | (JP) | 296/99.1 |

* cited by examiner

Primary Examiner—Stephen T. Gordon
Assistant Examiner—Lori L. Coletta
(74) Attorney, Agent, or Firm—Milde, Hoffberg & Macklin, LLP

(57) ABSTRACT

A deployable windshield sun visor made of tinted plastic, or tinted safety glass is retracted and stored in the roof of the vehicle. The shield is deployed upon the activation of a switch and will then move down upon the windshield to thereby lessen glare and otherwise operate to decrease the brightness of the sun's effects. The panel or visor may be either on the outside or inside surface of the windshield and is in close connection to it. Optionally the panel may be constructed as a pair of panels so that the driver and passenger may choose whether the panel should be deployed on their side or not.

3 Claims, 11 Drawing Sheets

AUTO VISOR

FIELD AND BACKGROUND OF THE INVENTION

The invention relates to the field of vehicles with windshields and shading devices for such and in particular to a shading device for a windshield that will be retractable within the vehicle and will be of the same structural integrity as the auto.

It is believed that the device will be an advantage over conventional sun visors that are made of cloth and similar materials as this device will be of a structurally sound material and is easier to retract and deploy into the roof of the car by virtue of that construction.

PRIOR ART

While there are automotive sun visors in the prior art none of them is designed to be retractable into the roof or the existing sun visor of an automobile. The use of guideways and the construction of the apparatus of structurally sound materials are believed to be novel and offer advantages over those devices shown in the prior art. Nor are there are any devices that the inventor is aware of that are automatically deployed and retracted upon activation of control buttons located upon the steering wheel and/or column of the auto.

SUMMARY OF THE INVENTION

The invention is a deployable windshield sun visor that is constructed with a structurally sound material such as tinted PLEXIGLAS (sheets of solid transparent, resinous material), or tinted safety glass and is retractable and stored in the roof of the vehicle. The shield is deployed upon the activation of a switch and will then move down upon the windshield to thereby lessen glare and otherwise operate to decrease the brightness of the sun's effects. Guideways or tracks on the side of the windshield will guide the shield so that it move in close connection with the windshield. The guideway will be on the inside of the vehicle in the interior version of the apparatus and the guideways will be on the outside of the vehicle in the exterior version of the apparatus.

The panel or visor may be either on the outside or the inside surface of the windshield and is in close connection to it by virtue of the guideway. The driving means is stored in the roof and may be of a scissors type of variety or perhaps a pair of rods or of another sort. The driving means preferably is powered by a motor and the motor is preferably electric. Optionally the panel may be constructed as a pair of panels so that the driver and passenger may choose whether the panel should be deployed on their side or not.

It is an object of the invention to provide a windshield sun visor for vehicles that can be automatically deployed upon activation of a control located on the driver's steering wheel.

Another object of the invention is to provide a windshield sun visor that has at least a portion of the sun visor constructed of the same or similar structural materials as the automobile and thus can be structurally integrated within the vehicle's frame without denigrating the structural integrity of the vehicle.

Another object of the invention is to provide a windshield sun visor that can be retracted within the confines of the automobile and therefore store it in a non observable location so that it's function will not detract from the aesthetic appearance of the vehicle.

Another object of the intention is to provide a windshield sun visor that can be stored in a location within the roof of the vehicle and thus not increase the effect of drag on the vehicle when the shield is stored and out of use.

Other objectives of the invention will become apparent to those skilled in the art once the invention has been shown and described.

DESCRIPTION OF THE PREFERRED EMBODIMENT

Figure 1:
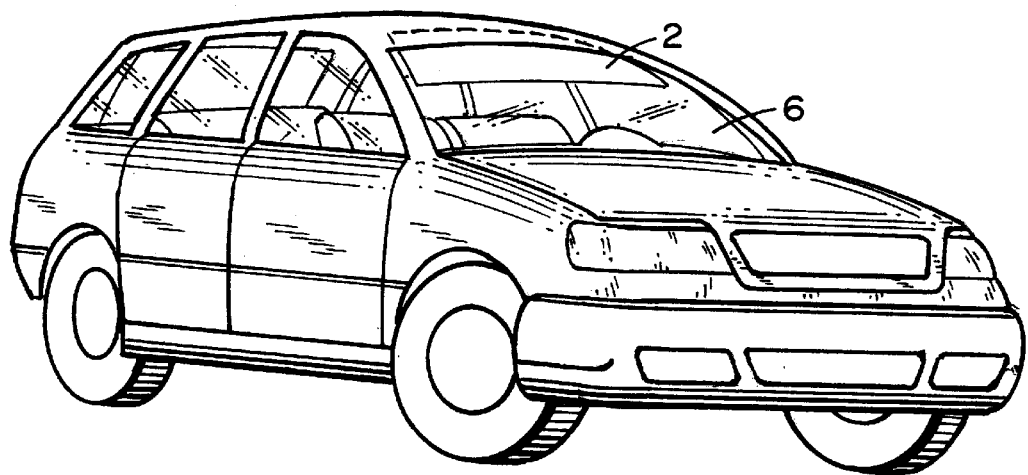
FIG. 1 Three quarters view.
Figure 2:
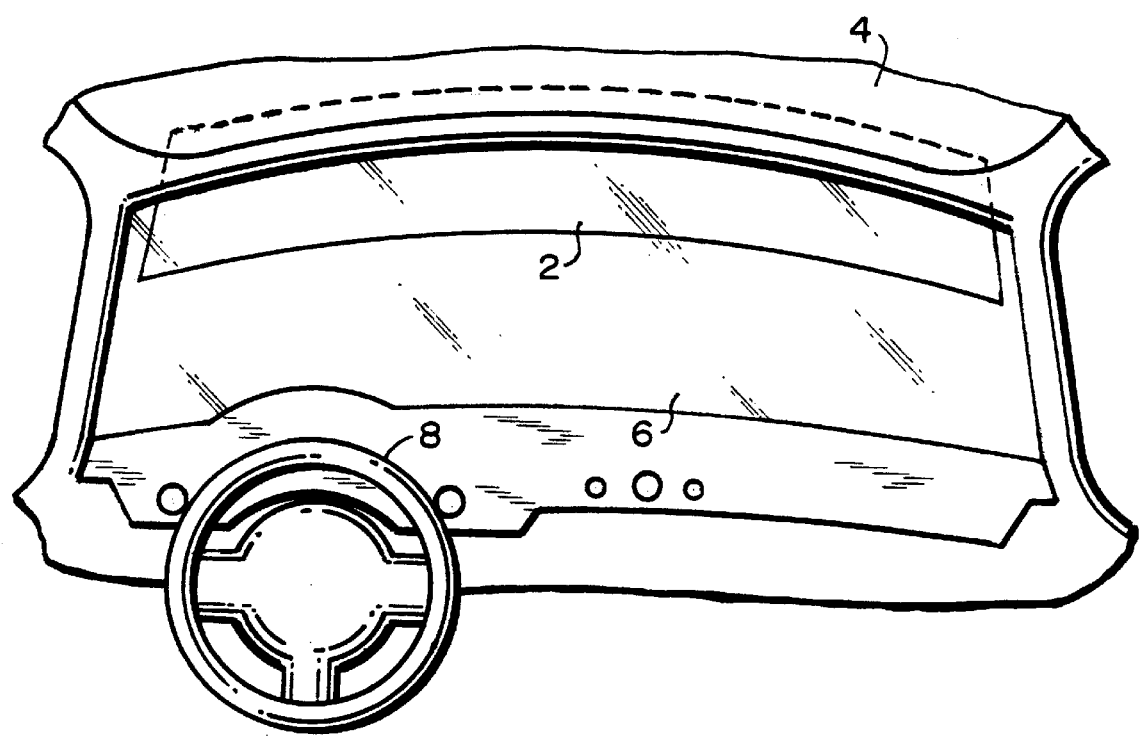
FIG. 2 driver's view.
Figure 3:
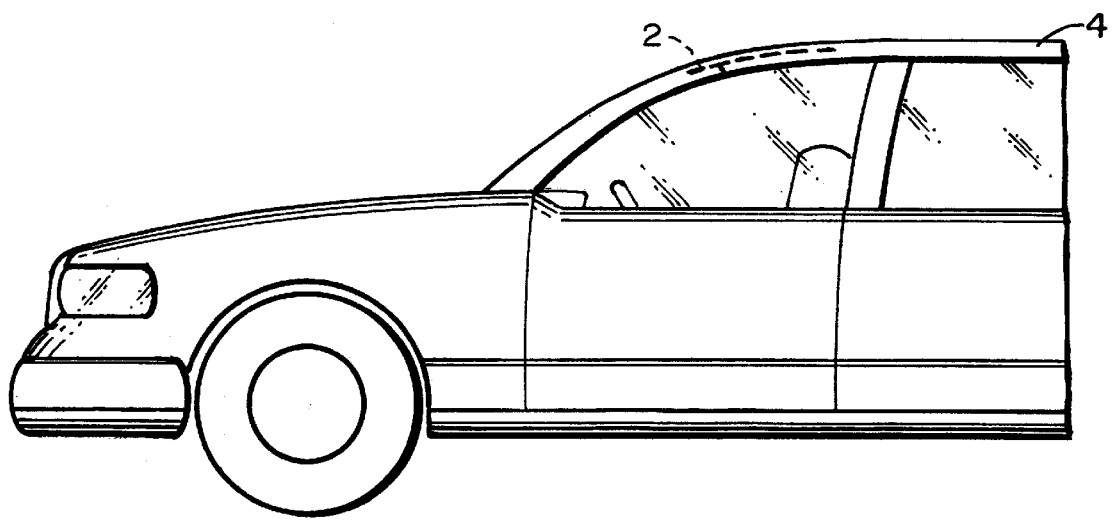
FIG. 3 side view with visor retracted.
Figure 4:
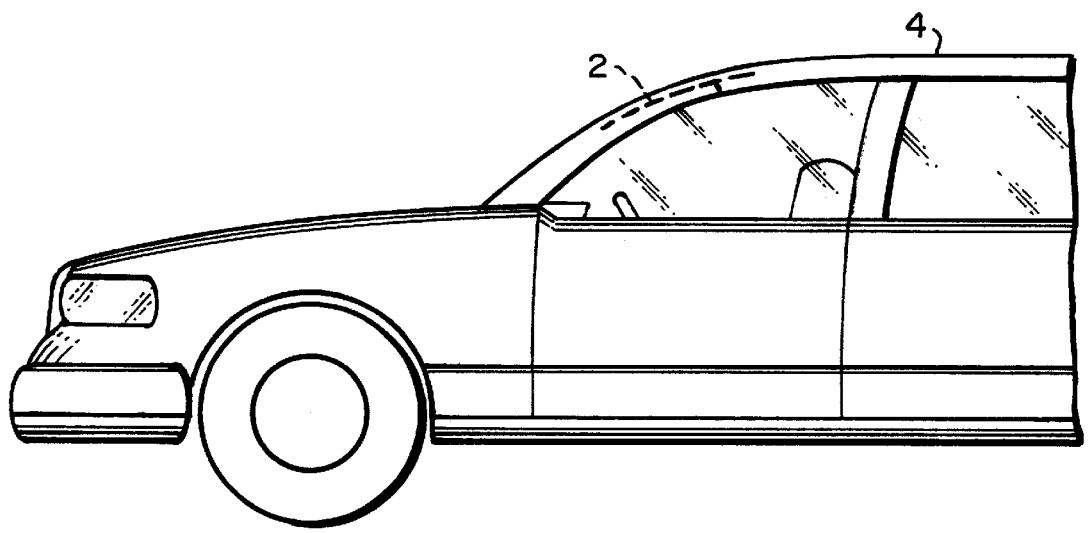
FIG. 4 side view with visor deployed.
Figure 5:
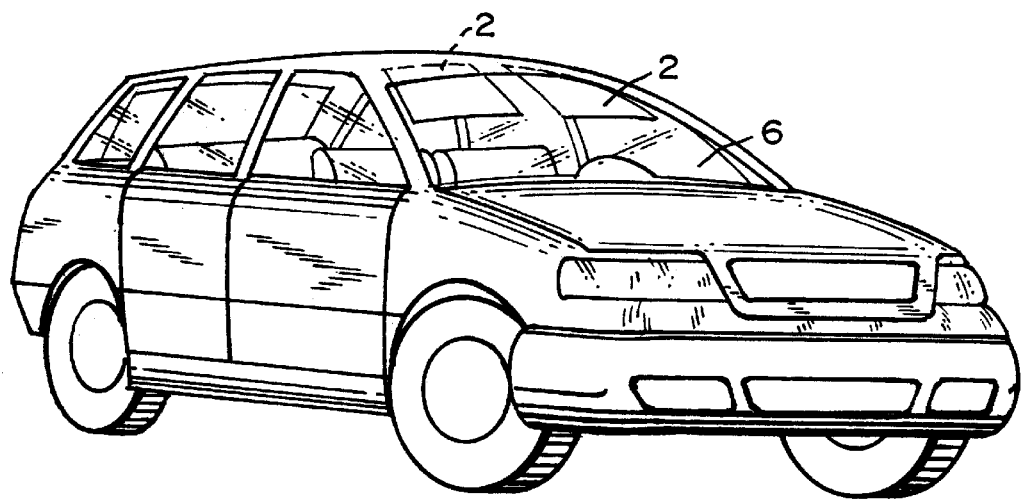
FIG. 5 three quarter's view dual panel version.
Figure 6:
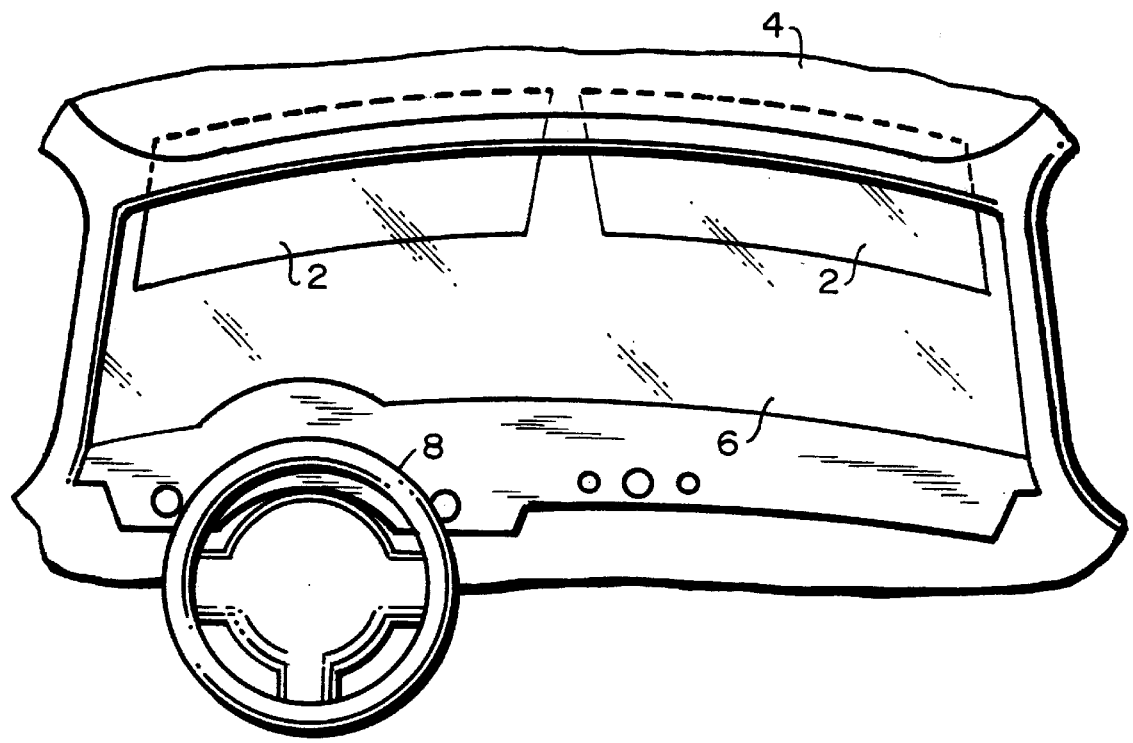
FIG. 6 drivers view of dual panel interior version.
Figure 7:
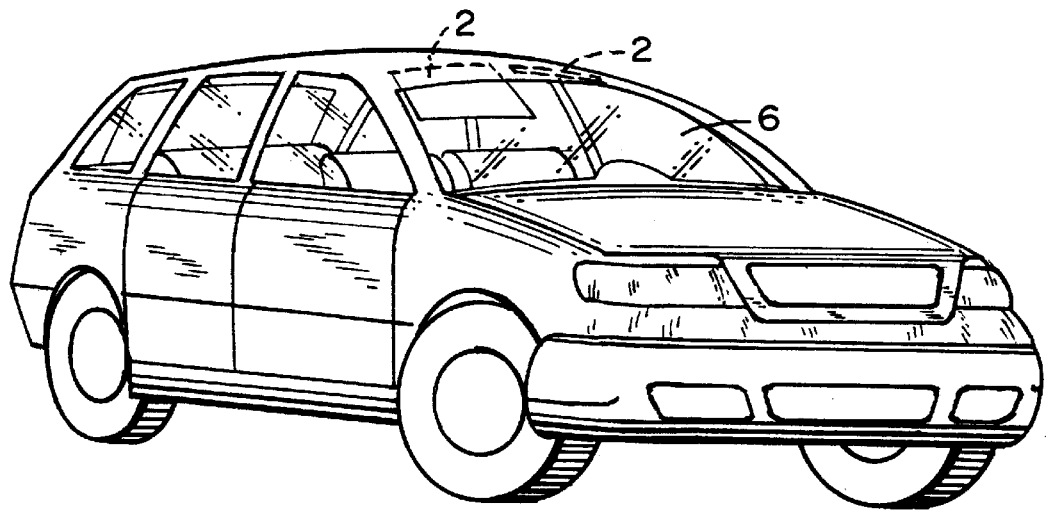
FIG. 7 three quarter's view of dual panel interior version.
Figure 8:
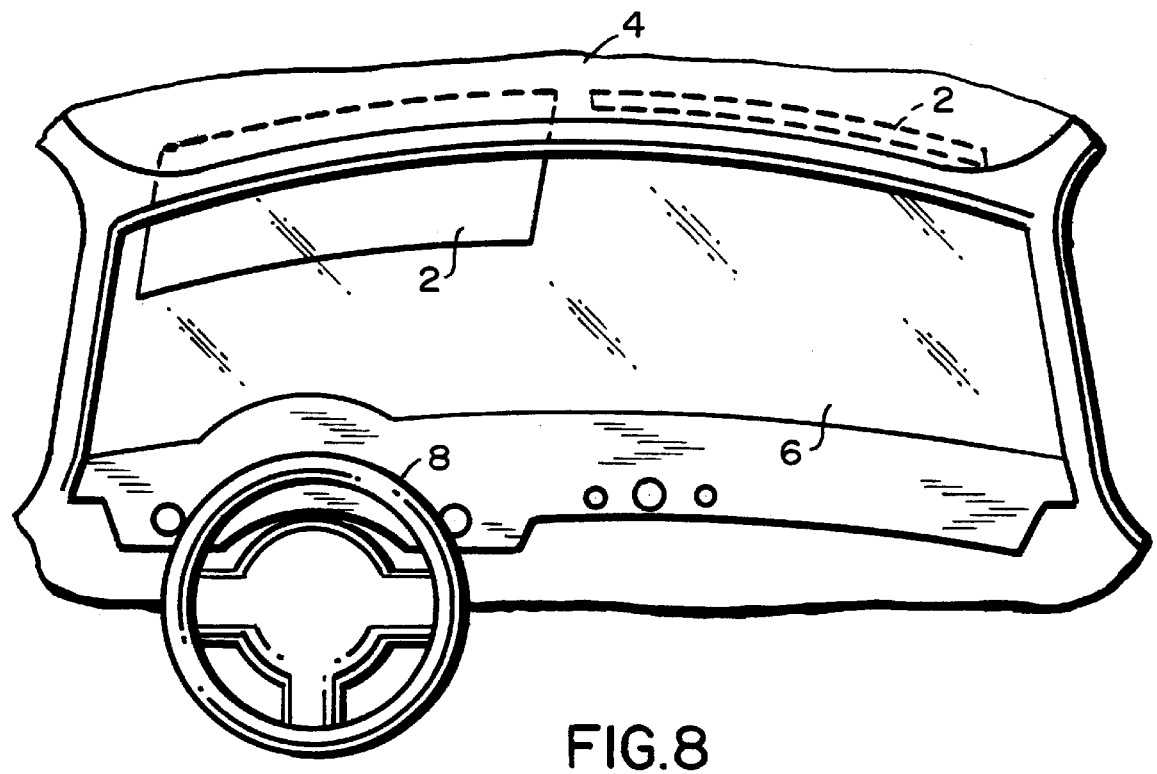
FIG. 8 drivers view of dual panel version.

Generally speaking the visor 2 (in FIG. 2) can be operated in the manner of modern day vehicle sun roofs where the driver activates a switch and the visor will retract to expose an opening in the roof of the car. The shield herein does not expose an opening as a sunroof, rather it covers the windshield 6 and may use a guideway and an operating system in a manner similar to such sun roofs. The switch may be in connection with the driver's steering wheel 8 so that the hands of the driver need never come off the wheel in order to deploy or retract the shield or visor.

Figure 9:
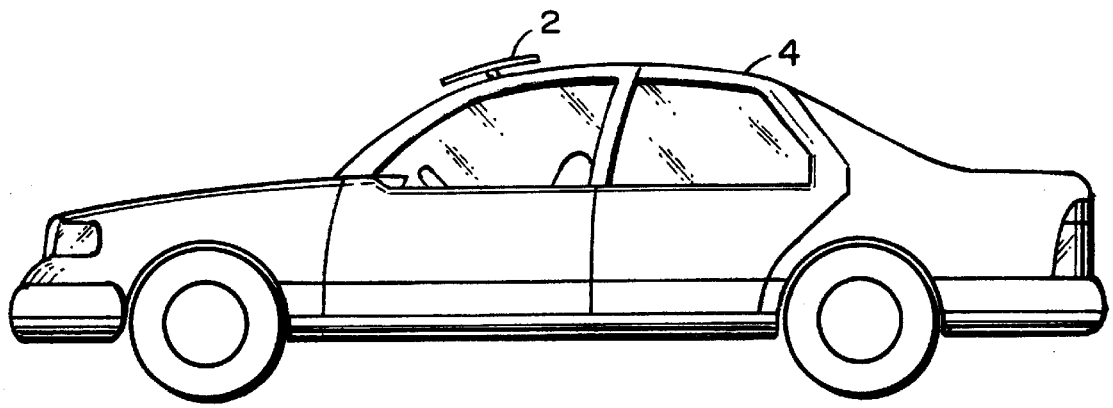
FIG. 9 exterior unit side view.
Figure 10:
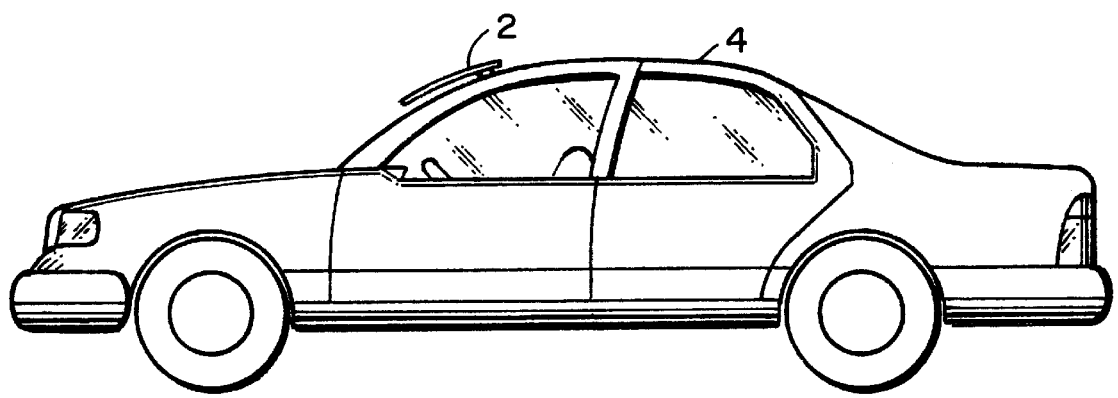
FIG. 10 exterior unit deployed.
Figure 9A:
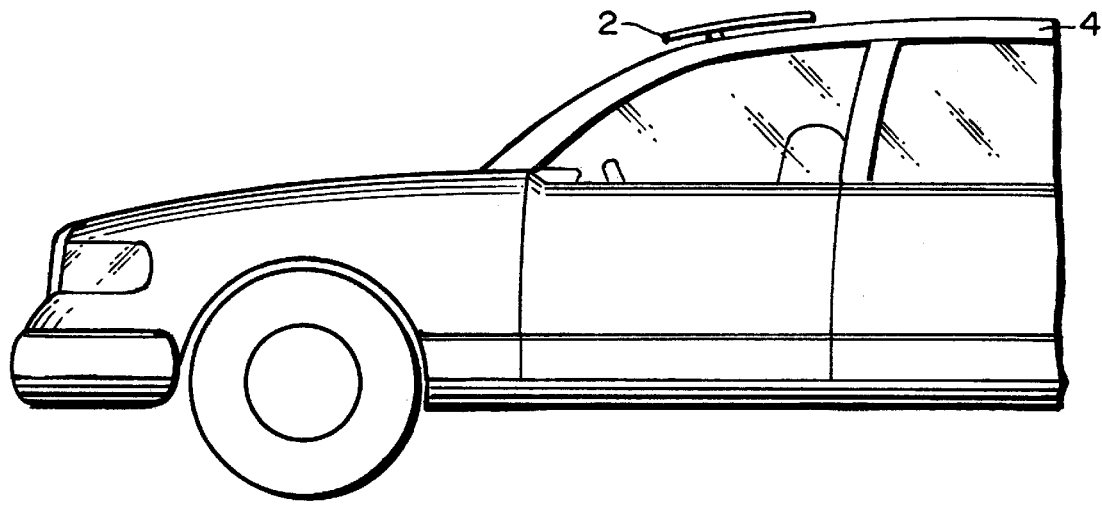
Figure 10A:
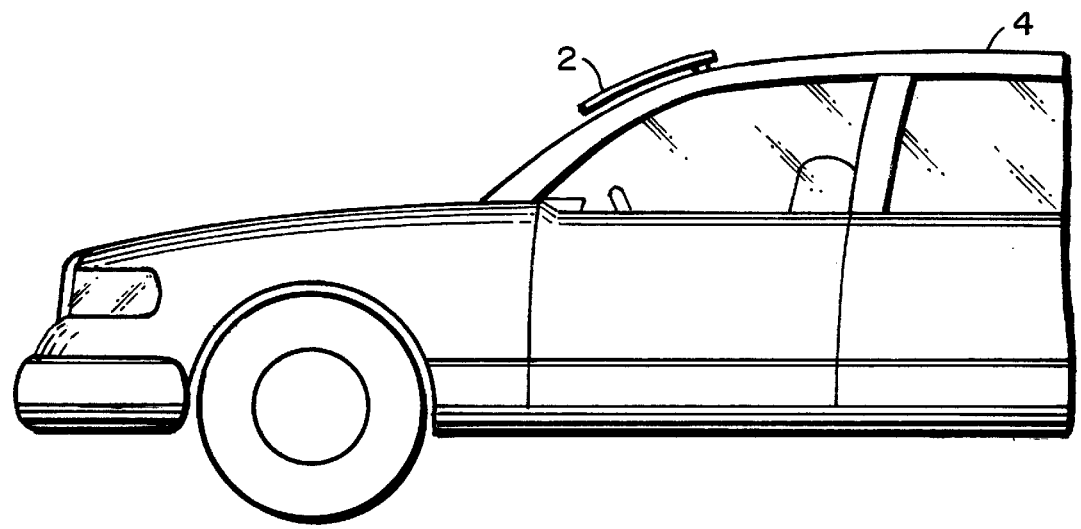

In the interior version of the visor it is mounted in the inside of the roof 4 where it can be stored and then will deploy upon the interior surface of the roof (see FIGS. 1–4). Alternatively for the basic exterior type, the shield and its mounting might also be mounted on the upper surface of the roof. This "scoop version" of the apparatus would include the guideway for the shield that would be mounted on the outside surface of the auto. (see FIGS. 9, 10 and 16) Such guideway would be on the outside of the roof and the guideway might extend down along the sides of the windshield frame and be an extension of those sides of the frame.

When the shield is mounted within the roof (as it is for one of the exterior versions as well as the interior version, described below) there needs to be an opening in the roof to accommodate the deployment and the retraction of the visor. Such opening, in all cases, will need to be as large as the width of the visor which in any case will be nearly the same as the width of the windshield. In the case of the exterior version of the visor, the opening will need to be on the outside of the windshield and parallel to the upper edge of the windshield so that the visor will deploy above the outside surface of the windshield and parallel to it.

In the interior version of the visor the visor will come down upon the inside surface of the windshield and may also retract into the roof. In the interior version of the visor apparatus the opening in the roof will need to be near the upper edge of the windshield and in the interior roof of the vehicle, so that the visor will deploy in close connection to the inside surface of the windshield and very close to it. In both cases, the visor should be relatively close to the surface of the windshield. It is preferred that this distance be about ¼" in both the exterior and interior visor versions By "outside surface" of the windshield it is meant that side that is exposed to the elements, and the "inside surface" refers to the side of the windshield that faces the passenger compartment.

The various optional arrangements of exterior versus interior and dual versus single panel can be used with one another for a total of four different basic arrangements. FIGS. 5–8 show views of the dual version in both the exterior and interior types of arrangements.

In the dual visor version, the arrangement is similar to the basic single version however there are two visor instead of one. Thus there needs to be two tracks to guide both of the visors and there needs to be two openings in the roof to allow or the deployment and retraction of each of the visors. In the dual version, there should be separate activating systems for the driver panel and the passenger panel so that the deployment of the panel is optional with them. In such case, the panel will be about half the width of the windshield. Note that in the sole panel version the panel will be about the entire width of the vehicle.

Figure 11:
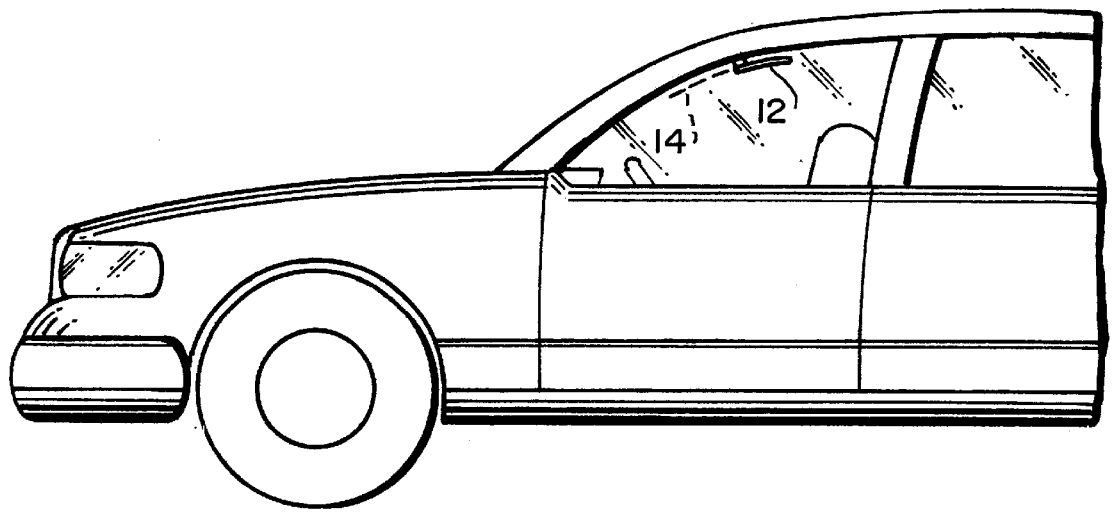
FIG. 11 external visor side view.
Figure 12:
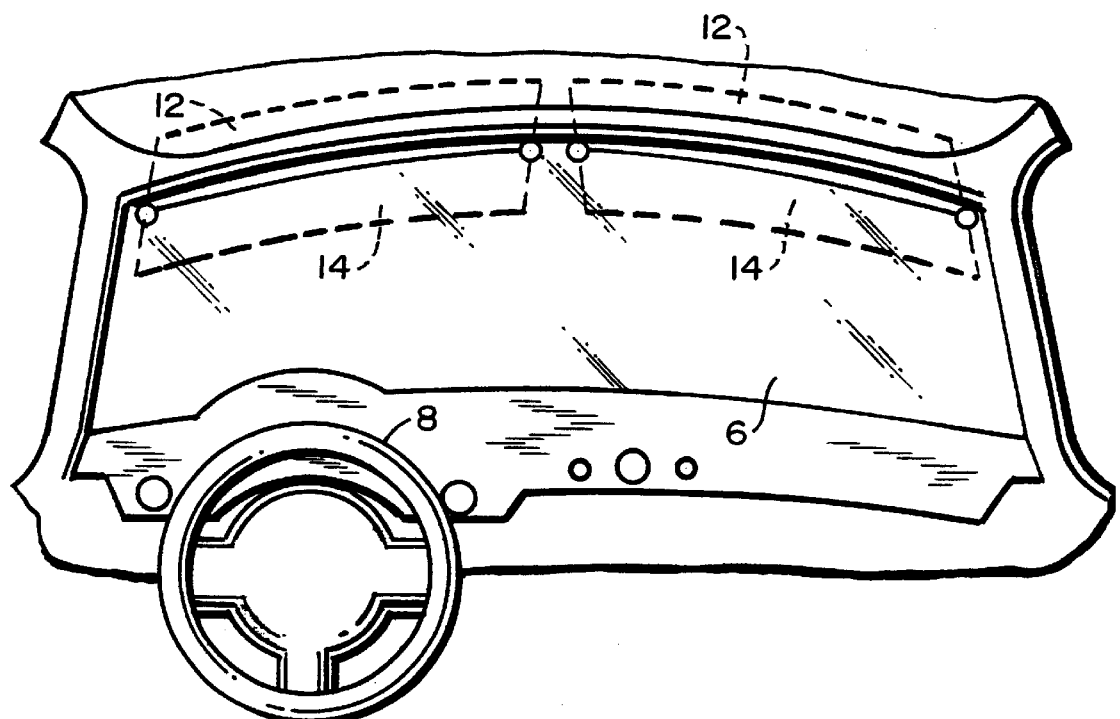
FIG. 12 drivers view of dual visor interior version with visor deployed out of the conventional sun visor.

FIGS. 11 and 12 show version where the novel sun visor 14 of this application is deployed out of the pre existing sun visor 12 that comes standard in every car. Again there will need to be an opening in the existing sun visor in order to accommodate the novel sun visor and there should be at least a guideway in the existing sun visor. In this case, there will be one deployable sun visor each of the existing sun visors.

Figure 13:
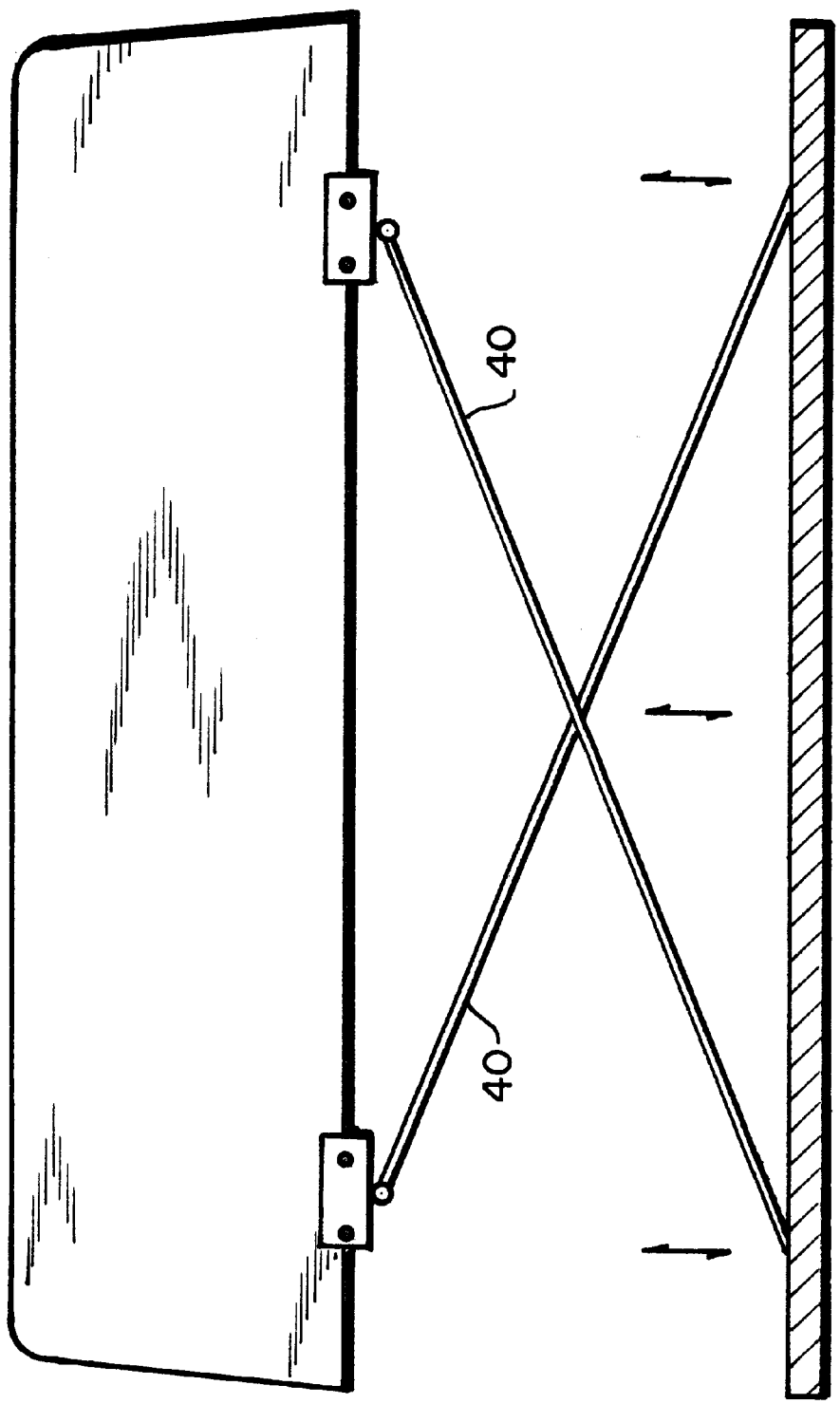
FIG. 13 top view of scissors type drive visor.

FIG. 13 shows a view of one type of drive device that would incorporate a scissors type of actuating device that is powered by a motor that will extend those arms 40 in the direction shown by arrows. The arms extend in the manner of a scissors and as the arms get closer together they will extend the sun visor in the deployed direction. I.e. down over the windshield. When the visor is retracted the arms move in the manner opposite and the visor will be retracted back into the roof.

Figure 14:
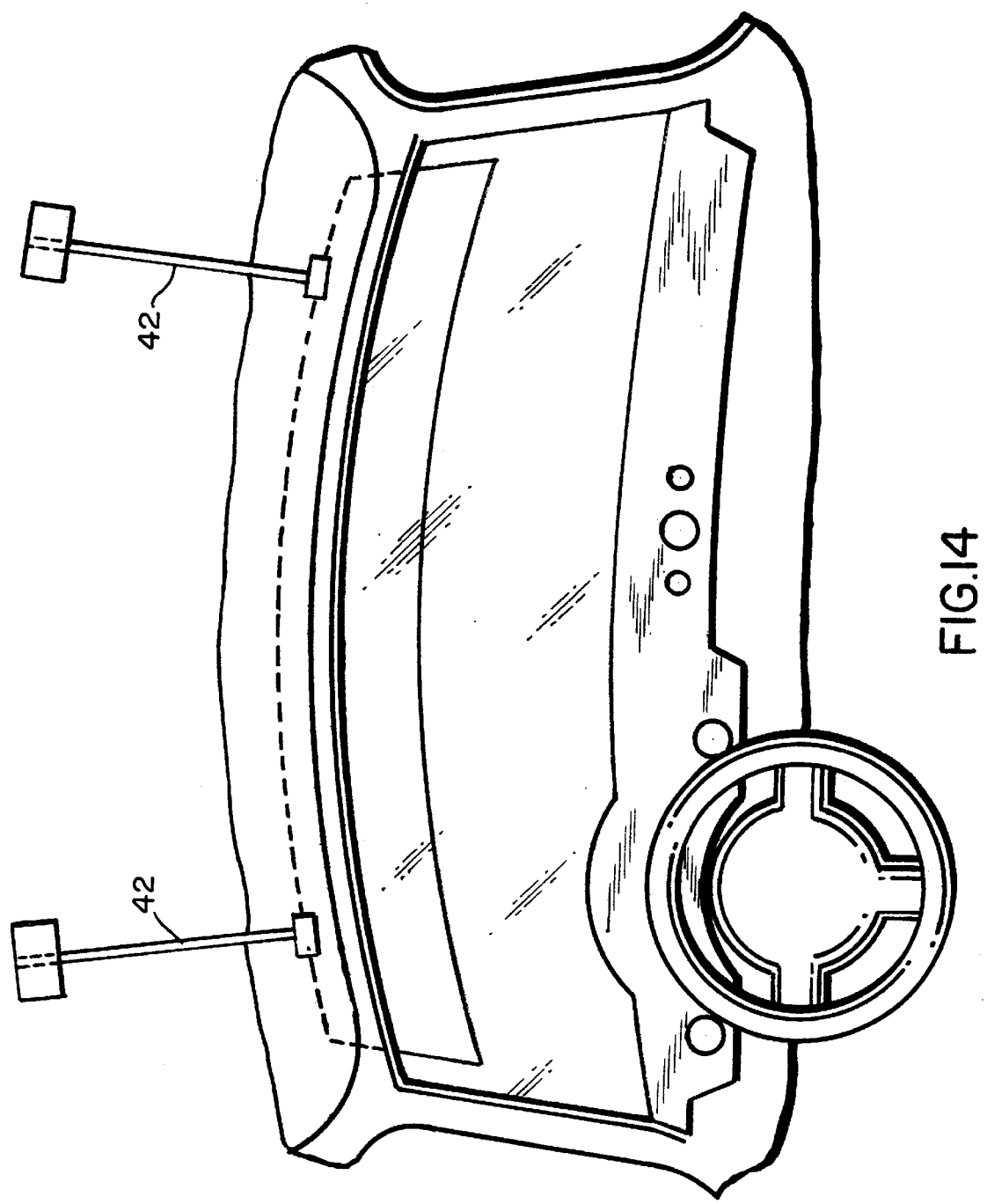
FIG. 14 top view of rod type of drive device.

FIG. 14 shows another type of driving mechanism using a pair of rods 42, attached to either side of the shield and the rods are powered so that they will move downward when the shield is desired to be deployed. And the rods will move opposite this direction to retract the rods back into the roof when the shield is retracted.

Figure 15:
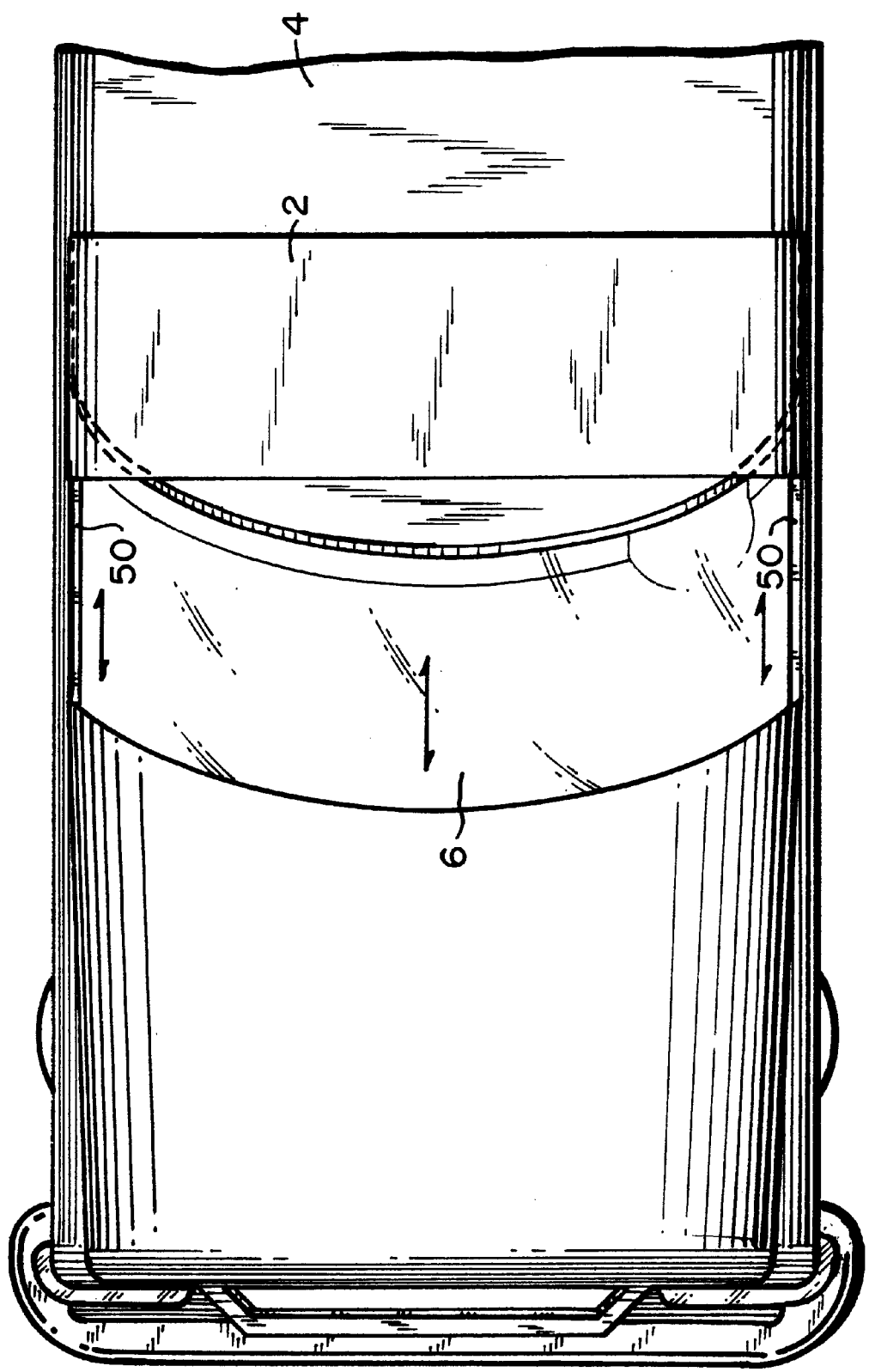
FIG. 15 top view of side tracks to align the sun visor

A guideway or track 50 as shown in FIG. 15 should be used to accommodate the shield. There are really two tracks; one on either side of the opening as can be seen in FIG. 15. The track may be something on the order of a groove that can hold the shield and direct its movements. The left and right sides of the shield will fit in the groove and this will guide the shield. It is believed, that the dual panel version of the visor would use a pair of tracks for each panel thus resulting in a total of four tracks used for the two panels.

Figure 16:
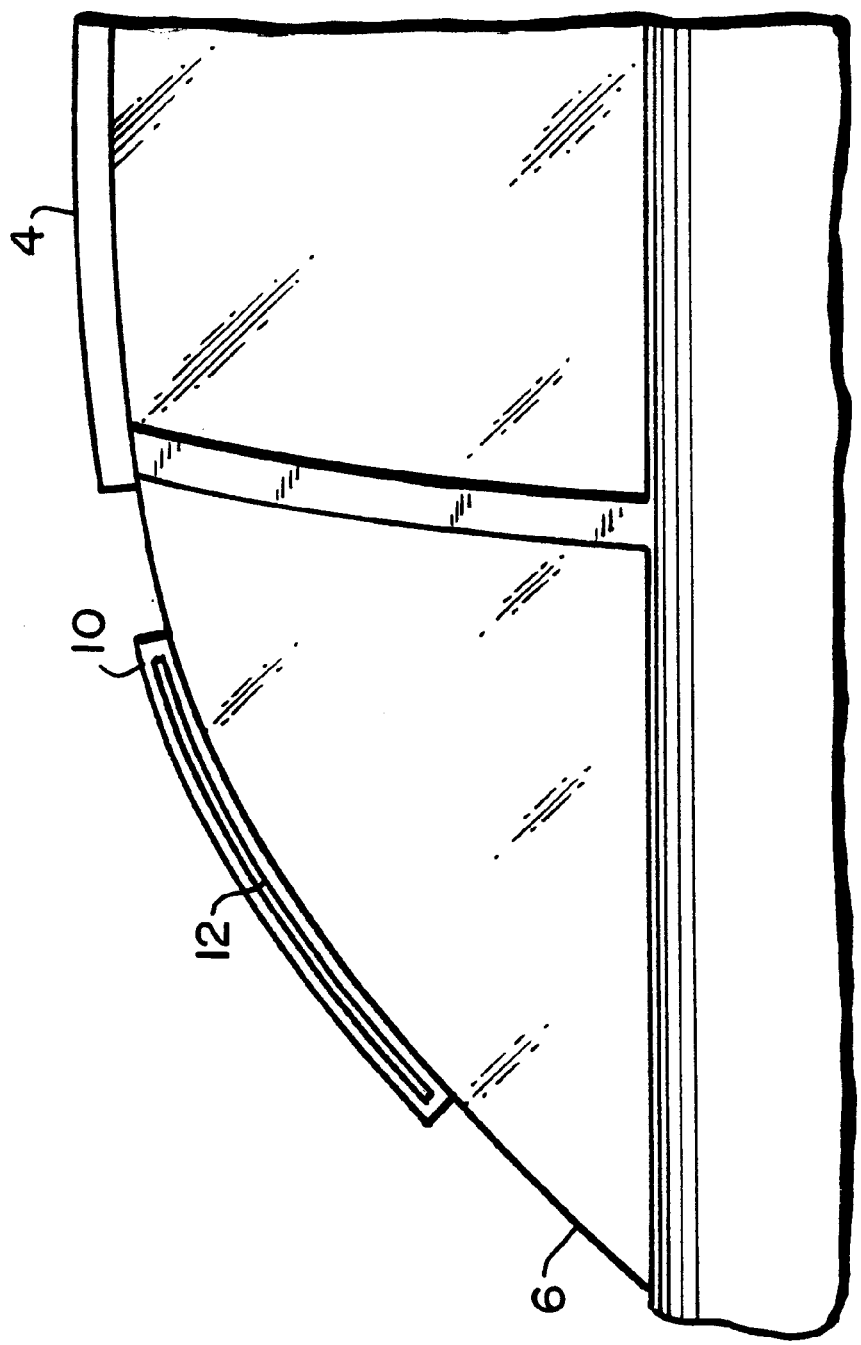
FIG. 16 side view of auto showing possible guideway.

In the case of the exterior version the track or guideway can be incorporated onto the frame of the windshield. FIG. 16 shows a side view of an exterior type of guideway. The guideway can also be used on the inside of the windshield and in this case, as well, it would be a part of the frame of the windshield. A part of the windshield frame 10 may be upraised slightly so that it may accommodate a groove 12 in the side of the frame (facing the center of the windshield) so that the groove can hold the exterior based visor as the sides of the visor can fit in the guideway. These guideways are optional with the manufacturer. If the visor is of rigid enough material a guideway in connection with the windshield may not be necessary.

The windshield based guideway described above is distinguished from the guideway inside the roof opening. Such guideway in the roof is mandatory in order to keep the visor in alignment and to guide its deployment.

The visor may be used in connection with the front and/or the rear windshields. In fact, a vehicle with both a front and rear deployable visor in the same vehicle is certainly possible. The term "vehicle" as used herein should refer to any type of vehicle that has the need for a windshield including automobiles, trucks, trains and possibly two wheeled vehicles depending on their construction.

In all of those cases the driving mechanism will be powered by a motor, The motor maybe electric or other. The motor will be made operable by activation of a mutual switch activated by the driver and/or passenger depending on whether the visor is single or double in nature. Note: the terms shield and visor are used interchangeable throughout.

The panel should be made of a structurally sound material such as PLEXIGLAS, safety glass (of the type found in modern day vehicles) and/or plastic. Such materials would of course need to be tinted or otherwise colored in order to insure that they will function with the desired shading effect. Various colors of tinted glass, etc. may be used. It is thought that a gray or deep blue color may offer the best protection however, other tinting colors may be used without varying the spirit of the invention.

An optional accessory kit might be sold as an after market item. Such kit might contain the necessary mounting device including the motor, the driving mechanism, the guideway or track (either a pair for the single panel or two pairs for the dual panel version) and the panel(s) itself.

I claim:

1. A vehicle windshield sun visor apparatus, the vehicle having a roof and a windshield in connection with said roof, said windshield having an outside surface and an inside surface, the sun visor apparatus comprising: a shading device of about planar shape and of a translucent material, said vehicle having a roof and said roof having an opening of size and shape to permit the movement of said shading device into and out of said roof and beneath said inside surface of said windshield, a drive unit for moving said shading device over said windshield by a user; a switch in connection with said vehicle for operating said drive unit; said opening positioned inside the vehicle so that said shading device will retract in close proximity to said inside surface of said windshield.

2. The apparatus of claim 1, wherein said shading device is made of a material selected from the group consisting of tinted glass and colored plastic.

3. The apparatus of claim 2, wherein said opening has a guideway, said guideway comprising at least two groove sections, said groove sections being of size and shape to accommodate left and right frame edges so that said shading device extends along said groove sections.

* * * * *